United States Patent
Zhang et al.

(10) Patent No.: US 10,785,740 B2
(45) Date of Patent: *Sep. 22, 2020

(54) SIM PROVISIONING OF A MOBILE DEVICE

(71) Applicant: Microsoft Technology Licensing, LLC, Redmond, WA (US)

(72) Inventors: Dajiang Zhang, Beijing (CN); Jussi Tapani Lokasaari, Espoo (FI); Antti Jouko Iisakki Järvinen, Espoo (FI); Sami Johannes Kekki, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,018

(22) Filed: Aug. 7, 2019

(65) Prior Publication Data
US 2019/0364531 A1    Nov. 28, 2019

Related U.S. Application Data

(63) Continuation of application No. 15/760,556, filed as application No. PCT/CN2015/091552 on Oct. 9, 2015, now Pat. No. 10,420,055.

(51) Int. Cl.
*H04W 4/00* (2018.01)
*H04W 60/00* (2009.01)
(Continued)

(52) U.S. Cl.
CPC ........... *H04W 60/00* (2013.01); *G06F 21/44* (2013.01); *H04L 61/1588* (2013.01);
(Continued)

(58) Field of Classification Search
CPC ....... H04W 8/04; H04W 12/06; H04W 60/00; H04W 12/08; H04W 88/02; H04L 63/08;
(Continued)

(56) References Cited

U.S. PATENT DOCUMENTS 9,386,405 B2 * 7/2016 Velusamy ............. H04W 64/00
2008/0305832 A1 * 12/2008 Greenberg ............. H04W 8/18
455/557
(Continued)

FOREIGN PATENT DOCUMENTS

CN    102440016 A    5/2012
CN    102595400 A    7/2012
(Continued)

OTHER PUBLICATIONS

"Office Action Issued in European Patent Application No. 15905677.9", dated Nov. 6, 2019, 5 Pages.
(Continued)

*Primary Examiner* — Danh C Le (57) ABSTRACT

There is provided a device comprising a key request module and a key receive module. The key request module is configured to transmit a key request to a provisioning server, and the key receive module is configured to receive a device root key associated with the device from the provisioning server. The device also comprises an authentication request transmit module configured to transmit an authentication request comprising an international mobile subscriber identity (IMSI) and a device identifier identifying the device to a first home subscriber server (HSS). The device also comprises an authentication under key agreement (AKA) module configured to perform an AKA procedure using the device root key. The key request module, the key receive module, the authentication request transmit module and the AKA module thereby authenticate the device for subscriber identity module (SIM) provisioning of the device.

20 Claims, 10 Drawing Sheets

(51) Int. Cl.

| | | |
|---|---|---|
| *H04W 8/18* | (2009.01) | |
| *H04W 12/04* | (2009.01) | |
| *H04W 12/06* | (2009.01) | |
| *H04W 4/50* | (2018.01) | |
| *H04W 4/60* | (2018.01) | |
| *H04W 12/00* | (2009.01) | |
| *G06F 21/44* | (2013.01) | |
| *H04L 29/12* | (2006.01) | |
| *H04L 29/06* | (2006.01) | |
| *H04W 8/04* | (2009.01) | |
| *H04W 8/26* | (2009.01) | |

(52) U.S. Cl.
CPC ........ *H04L 63/061* (2013.01); *H04L 63/0853* (2013.01); *H04L 63/0876* (2013.01); *H04W 4/50* (2018.02); *H04W 4/60* (2018.02); *H04W 8/04* (2013.01); *H04W 8/18* (2013.01); *H04W 8/26* (2013.01); *H04W 12/0023* (2019.01); *H04W 12/04* (2013.01); *H04W 12/06* (2013.01); *H04L 61/6054* (2013.01)

(58) Field of Classification Search
CPC ...... H04L 63/10; H04L 9/32; H04M 1/72519; H04M 1/72525
USPC ........................... 455/435.1, 411, 550.1, 450
See application file for complete search history.

(56) References Cited

U.S. PATENT DOCUMENTS

| | | | | |
|---|---|---|---|---|
| 2010/0079607 | A1* | 4/2010 | Won | G08C 17/02 348/211.2 |
| 2010/0302948 | A1* | 12/2010 | Sawai | H04W 16/14 370/241 |
| 2013/0012168 | A1* | 1/2013 | Rajadurai | H04L 9/0822 455/411 |
| 2016/0036580 | A1* | 2/2016 | Shealy | H04L 5/08 370/297 |
| 2016/0134709 | A1* | 5/2016 | Savolainen | H04L 67/16 370/338 |
| 2016/0174069 | A1* | 6/2016 | Bruner | H04W 8/18 455/411 |
| 2016/0344745 | A1* | 11/2016 | Johnson | H04L 41/0803 |
| 2017/0005680 | A1* | 1/2017 | Lokasaari | H04B 1/3816 |
| 2017/0347278 | A1* | 11/2017 | Gonzalez | H04B 1/385 |

FOREIGN PATENT DOCUMENTS

| | | |
|---|---|---|
| CN | 103314605 A | 9/2013 |
| WO | 2014041806 A1 | 3/2014 |

OTHER PUBLICATIONS

"First Office Action Issued in Chinese Patent Application No. 201580071437.7", dated Nov. 5, 2019, 16 Pages.

\* cited by examiner

SIM PROVISIONING OF A MOBILE DEVICE

CROSS REFERENCE TO RELATED APPLICATIONS

This application is a continuation of U.S. application Ser. No. 15/760,556, entitled "SIM PROVISIONING OF A MOBILE DEVICE," filed Mar. 15, 2018 which claims priority to Patent Cooperation Treaty Application Serial Number PCT/CN2015/091552, entitled "SIM PROVISIONING OF A MOBILE DEVICE," filed Oct. 9, 2015, which are incorporated herein in their entirety.

BACKGROUND

When a mobile device with an embedded subscriber identity module (SIM) is purchased by a consumer, it must be first be provisioned before it can provide full functionality using the cellular network. During first time provisioning, the device communicates with the network operator over the cellular network in order to authenticate the device. The authentication procedure uses an international mobile subscriber identity (IMSI) associated with the device which the operator stores in a home location register (HLR).

As the number of mobile consumer devices increases, so does the burden on the operator to store device specific IMSIs and other provisioning data for one time provisioning over the cellular network. This is especially burdensome because operators are required to store this data for several years after the devices are launched. Thus, there is an ongoing cost related to each IMSI for mobile operators.

The situation is also burdensome to original equipment manufacturers because, if pre-provisioning embedded subscriber identity module (SIM) devices in the factory, the manufacturer must request device specific IMSIs from the operator.

A solution is required which maintains a good end user experience including easy access to the cellular network in first time device use. The current Groupe Special Mobile Association (GSMA) specification for provisioning an embedded SIM uses a provisioning profile, also known as a non-operational profile. A current proposal for managing the increasing number of consumer devices is to use non-cellular provisioning which requires non-cellular network availability at the time of provisioning. Non-cellular network availability may not always be accessible, and some low cost devices lack non-cellular network functionality.

The embodiments described below are not limited to implementations which solve any or all of the disadvantages of known SIM provisioning techniques.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

There is provided a device comprising a key request module and a key receive module. The key request module is configured to transmit a key request to a provisioning server, and the key receive module is configured to receive a device root key associated with the device from the provisioning server. The device also comprises an authentication request transmit module configured to transmit an authentication request comprising an international mobile subscriber identity (IMSI) and a device identifier identifying the device to a first home subscriber server (HSS). The device also comprises an authentication under key agreement (AKA) module configured to perform an AKA procedure using the device root key. The key request module, the key receive module, the authentication request transmit module and the AKA module thereby authenticate the device for subscriber identity module (SIM) provisioning of the device.

There is also provided a method of SIM provisioning at a device. The method comprises transmitting a key request to a provisioning server; receiving a device root key associated with the device from the provisioning server; transmitting an authentication request comprising an IMSI and a device identifier identifying the device to a first HSS; and performing an AKA procedure using the device root key.

There is also provided a tangible device-readable media with device-executable instructions that, when executed by a computing system, direct the computing system to perform a method comprising: transmitting a key request to a provisioning server; receiving a device root key associated with the device from the provisioning server; transmitting an authentication request comprising an IMSI and a device identifier identifying the device to a first HSS; and performing an AKA procedure using the device root key.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an example telecommunications system, the example telecommunications system described is provided as an example and not a limitation. As those skilled in the art will appreciate, the present examples are suitable for application in a variety of different types of telecommunications systems.

Traditionally, a unique IMSI is required to provision each embedded SIM device. In this approach, a device is provisioned by an authentication procedure that uses a subscriber root key associated with the embedded SIM. Since the SIM is embedded, the subscriber root key is uniquely associated with the device, and it can be established that the device can be trusted.

In the present examples, a shared IMSI is used for provisioning a group of embedded SIM devices, and keys required for authenticating the devices in the network attachment procedure are derived. By using a shared IMSI for a group of devices, the pre-provisioning of embedded SIM devices in a factory is straightforward because the same provisioning profile can be used with a group of devices. Cellular remote provisioning is enabled without the cost associated with the current provisioning profile solution defined in the GSMA embedded SIM (ESIM) specification.

Since a shared IMSI is used for different devices, the subscriber root key associated with the embedded SIM is no longer uniquely associated with the device. As a result, the subscriber root key cannot be used in an authentication procedure to establish that the device can be trusted.

The present examples use a different approach. In the present examples, a device with a shared IMSI can be provisioned by using a device-specific key derived for the authentication procedure. This approach utilizes the observation that it is not necessary to have two unique identifiers (such as a unique IMSI and a unique device identifier) to provision a device having an embedded SIM.

Figure 1:
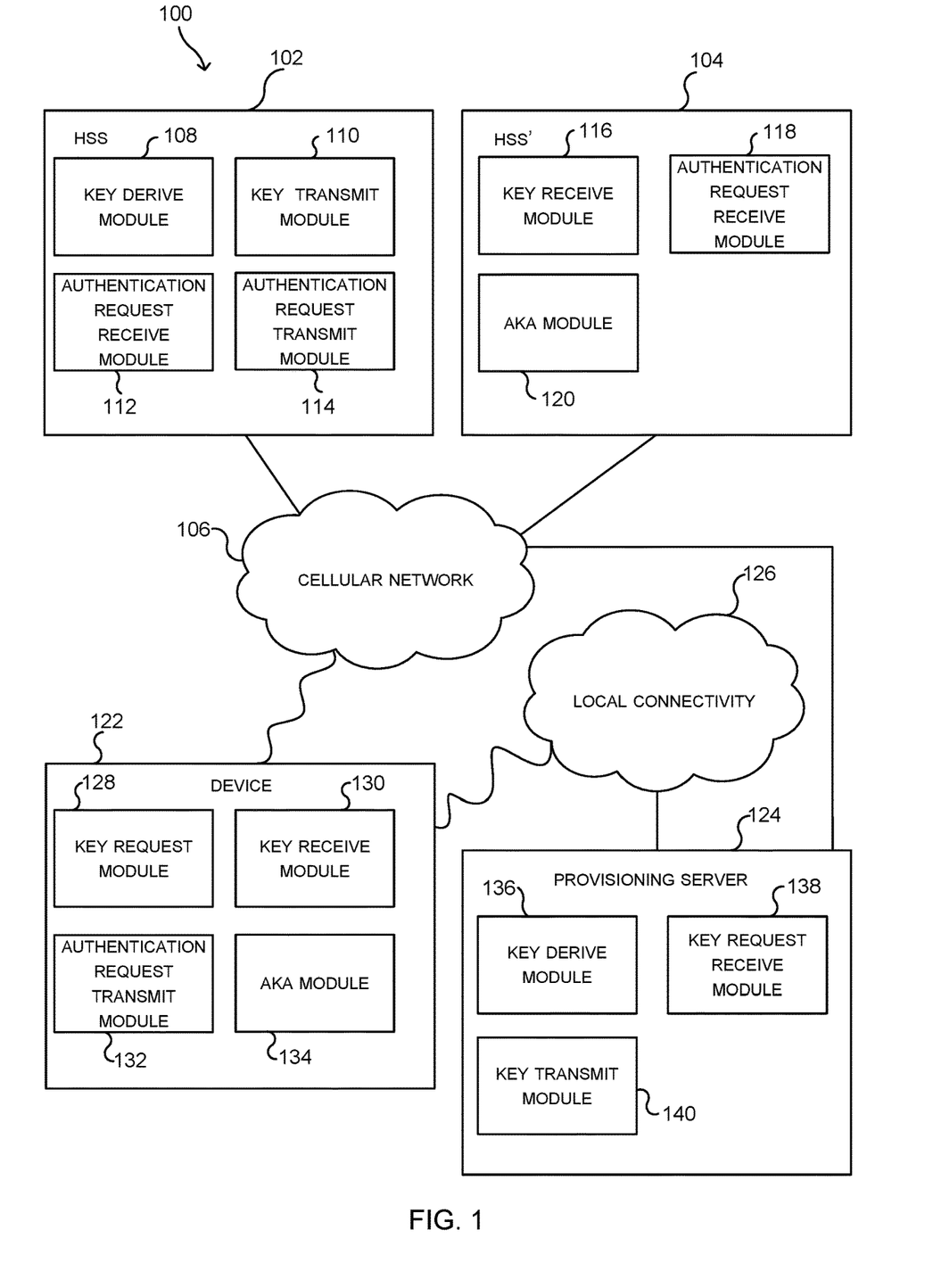
FIG. 1 is a schematic diagram illustrating elements of a communications network for provisioning an embedded SIM of a device.

FIG. 1 shows a communications network 100 in which various examples may be implemented. The communications network 100 comprises a first HSS 102, a second HSS 104, and a cellular network 106 of a mobile network operator. Each of the first HSS 102 and the second HSS 104 comprise an HSS as defined in the 3GPP standards. The first HSS 102 comprises a key derive module 108, a key transmit module 110, an authentication request receive module 112 and an authentication request transmit module 114, and is connected to the cellular network 106. The second HSS 104 comprises a key receive module 116, an authentication request receive module 118 and an AKA module 120.

The communications network 100 also comprises a device 122 having cellular connection capability. The device 122 is connected to the cellular network 106 and to a provisioning server 124 for remote embedded SIM provisioning via local connectivity 126. The device 122 comprises a key request module 128, a key receive module 130, an authentication request receive module 132 and an AKA module 134. The provisioning server 124 comprises a key derive module 136, a key request receive module 138 and a key transmit module 140. The provisioning server 124 is also connected to the cellular network 106. In various examples, the provisioning server 124 comprises a subscription manager data provisioning server (SM-DP server).

The provisioning server 124, device 122, first HSS 102 and second HSS 104 are configured to perform a procedure for provisioning a SIM at the device 122.

Figure 2:
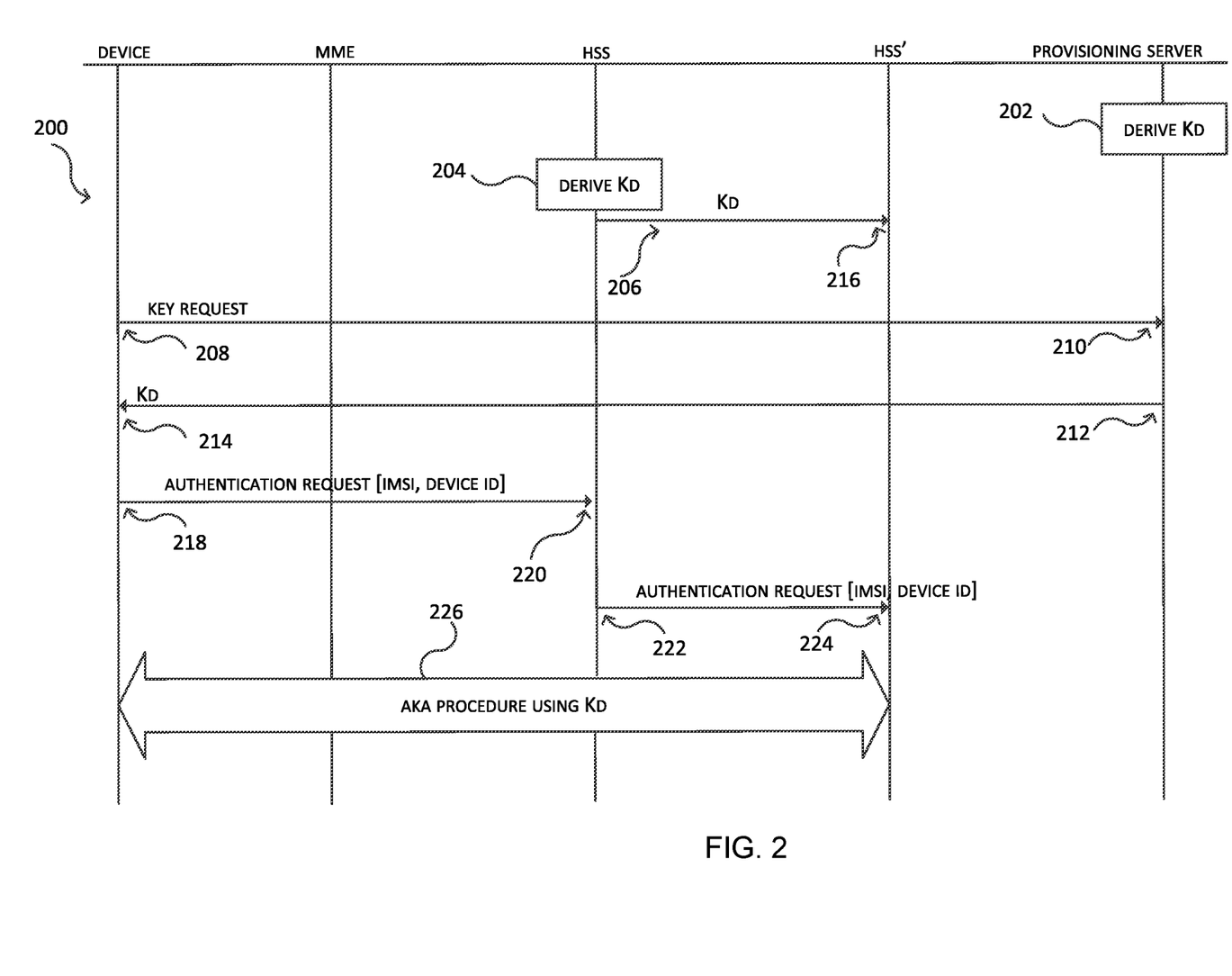
FIG. 2 is a signaling diagram illustrating a series of communications between the elements of the communications network of FIG. 1 for provisioning an embedded SIM of a device.

FIG. 2 shows a signaling procedure 200 implemented in various examples by the device 122, provisioning server 124, first HSS 102 and second HSS 104 for provisioning a SIM at the device 122 in various examples. At action 202, the provisioning server 124 derives a device root key, $K_D$, that is uniquely associated with the device 122. At action 204, the first HSS 102 also derives the device root key, $K_D$, and at action 206 transmits it to the second HSS 104. In various examples, the provisioning server 124 and the first HSS 102 derive the device root key using the device identifier and a subscriber root key associated with an IMSI of the device 122.

At action 208, the device 122 transmits a key request to the provisioning server 124 which the provisioning server 124 receives at action 210. In response to receiving the key request at action 210, the provisioning server 124 transmits the device root key at step 212 to the device 122. The device 122 receives the device root key at step 214 and subsequently uses the device root key in an AKA procedure. In various examples, the device 122 transmits a request for a non-operational profile, a NOP request, to the provisioning server 124, and receives a non-operational profile for the device, a device NOP, from the provisioning server 124. In such examples, the provisioning server 124 receives a NOP request from the device 122 and transmits a NOP to the device 122.

An AKA procedure will be performed between the device 122 and the second HSS 104. As such, the second HSS 104 receives the device root key from the first HSS 102 at action 216 and subsequently uses the device root key in the AKA procedure. In various examples, the second HSS 104 stores the device root key in a store of device root keys indexed by the corresponding device identifiers.

To initiate the AKA procedure, the device 122 transmits an authentication request at step 218 to the first HSS 102. The authentication request comprises an IMSI and a device identifier identifying the device. In various examples, the device identifier comprises an international mobile equipment identity (IMEI) of the device 122.

The first HSS 102 receives the authentication request at action 220 and transmits the authentication request to the second HSS at action 222. In various examples, the first HSS 102 recognizes that the authentication request includes the device identifier and forwards the authentication request to the second HSS 104 in response to recognizing that the authentication request includes the device identifier.

At action 224, the second HSS 104 receives the authentication request and is then ready for the AKA procedure. At action 226, the device 122 and the second HSS 104 perform an AKA procedure using the device root key. The AKA procedure may suitably be completed as defined in the 3GPP TS33.401 or TS33.102 telecommunications standards.

In various examples, the device 122 receives an operational profile for the device, a device OP, after successfully performing the AKA procedure.

Figure 3:
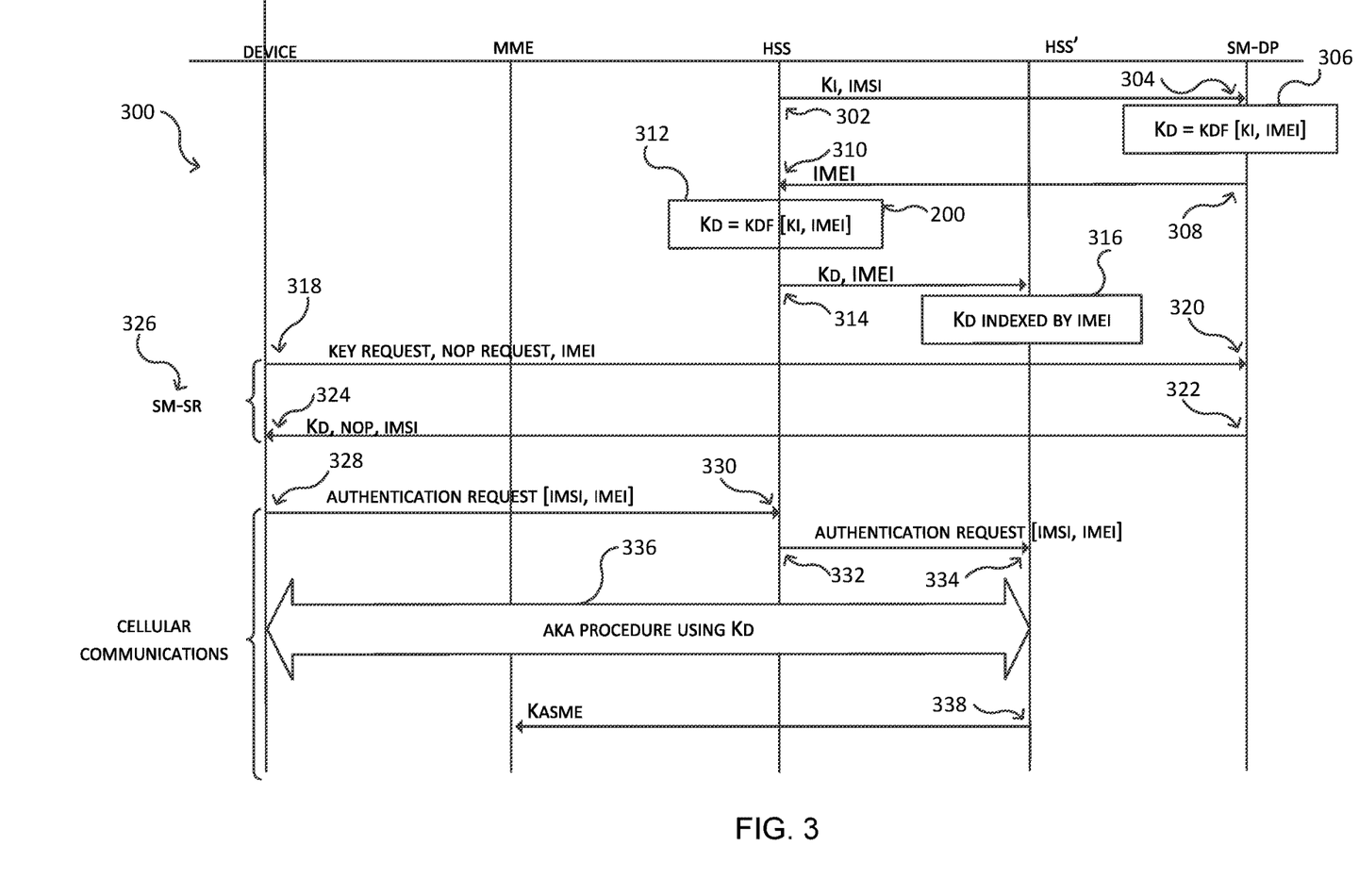
FIG. 3 is a signaling diagram illustrating another series of communications between the elements of the communications network of FIG. 1 for provisioning an embedded SIM of a device.

FIG. 3 shows a signaling procedure 300 implemented in various examples by the device 122, provisioning server 124, first HSS 102 and second HSS 104 for provisioning a SIM at the device 122. In these examples the provisioning server comprises an SM-DP server.

At action 302, the first HSS 102 transmits a subscriber root key, $K_I$, and an IMSI to the SM-DP server. The SM-DP server receives the subscriber root key at action 304 and uses it to derive a device root key, $K_D$. The SM-DP server derives the device root key at action 306 using the subscriber root key and an IMEI uniquely associated with the device 122. The device root key is derived by applying a key derivation function (KDF) to the subscriber root key and the IMEI. The KDF may refer to Annex A of 3GPP TS33.401.

At action 308, the SM-DP server transmits the IMEI to the first HSS 102. At action 310, the first HSS 102 receives the IMEI and can then also derive the device root key. In the same way as the SM-DP, the first HSS 102 derives the device root key at action 312 by applying a KDF to the subscriber root key and the IMEI. Since the IMEI is uniquely associated with the device 122, the device root key is also uniquely associated with the device 122. At step 314, the first HSS 102 transmits the device root key and the IMEI to the second HSS 104, which stores the device root key at action 316 in a store of device root keys in which the device root keys are indexed by the corresponding IMEI uniquely associated with the same device. This completes a preparatory stage of the signaling procedure 300.

At action 318, the device 122 transmits a key request, a NOP request and the IMEI to the SM-DP server. The SM-DP server receives them at step 320 and responds by transmitting the device root key, a NOP and the IMSI to the device 122 at step 322. The device 122 receives the device root key, NOP and IMSI at action 324. The IMSI is now available at the device 122 for requesting authentication and the device root key is available at the device 122 for performing an AKA procedure. The communications between the device and the SM-DP of actions 318, 320, 322 and 324 are performed using subscription manager secure routing (SM-SR).

At action 328, the device 122 transmits an authentication request comprising the IMSI and the IMEI to the first HSS 102. The first HSS 102 receives the authentication request at action 330. The first HSS 102 recognizes that the authentication request comprises an IMEI and, in response, forwards the authentication request at step 332 to the second HSS 104.

The second HSS 104 receives the authentication request at action 334 and subsequently initiates an AKA procedure between the device 122 and the second HSS 104. Since the authentication request comprises the IMEI, the second HSS 104 can match the IMEI, which is uniquely associated with the device, to the device root key which is also uniquely associated with the device 122 and which is stored in the store of device root keys. Thus, the second HSS 104 can retrieve the device root key uniquely associated with the device 122 for the purposes of performing an AKA procedure with the device 122.

At step 336, the device 122 and the second HSS 104 perform an AKA procedure to authenticate the device 122. When the AKA procedure has been completed successfully, the second HSS 104 subsequently derives a further key, $K_{ASME}$, and transmits it, at action 338, to a network node such as a mobility management entity (MME) of the mobile network operator for further actions.

Figure 4:
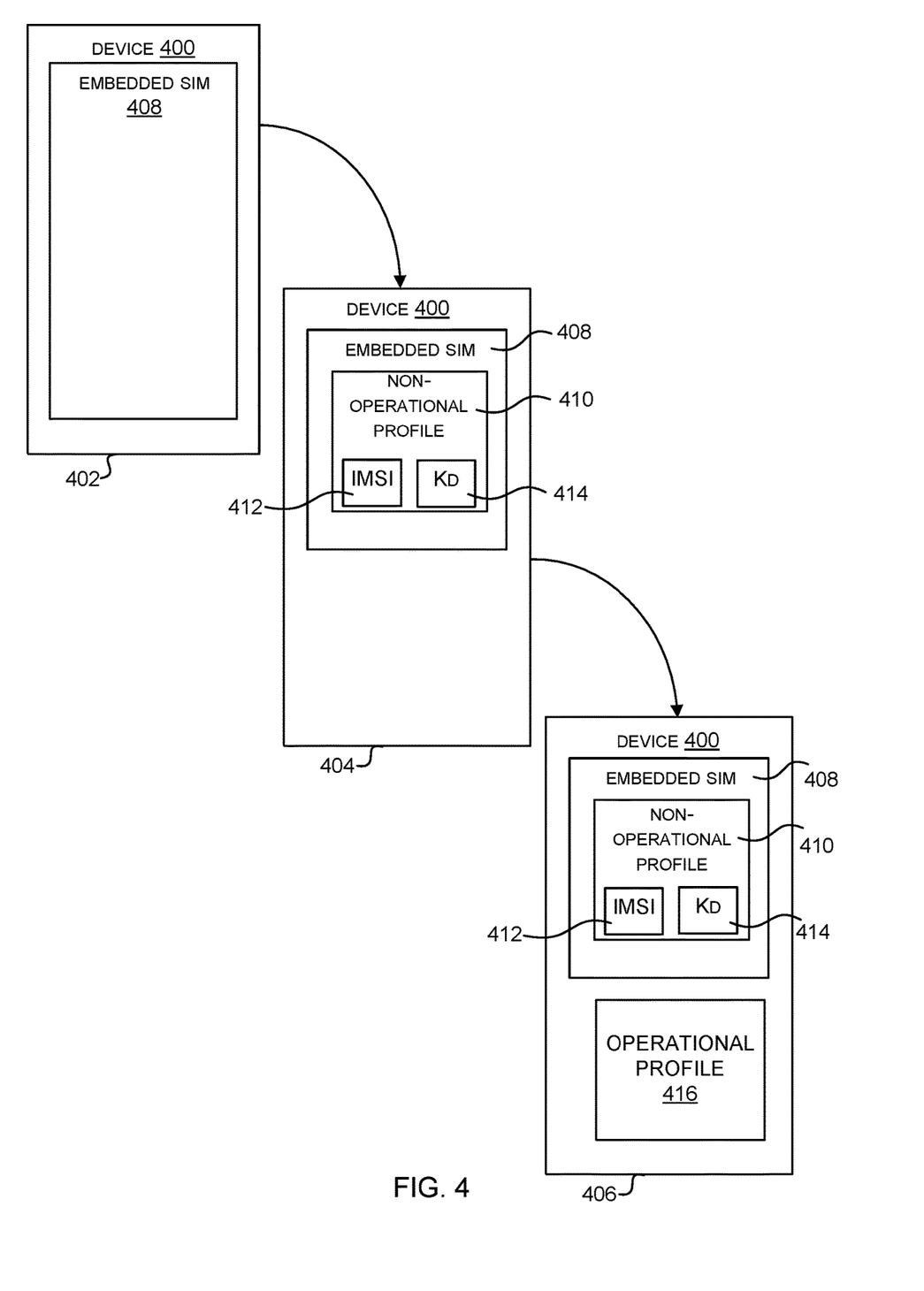
FIG. 4 is a series of state diagrams of a device at different stages of provisioning an embedded SIM of the device.

FIG. 4 shows a series of state diagrams of a device 400 according to various of the present examples in different states 402, 404 and 406 during the provisioning of a SIM of the device 400. After being manufactured, the device 400 is in state 402 with an embedded SIM chip and no profiles installed.

To change the device 400 from state 402 to state 404, a non-operational profile (NOP) 410 comprising a shared IMSI 412 and a device root key, $K_D$, 414 uniquely associated with the device 400 are received by the device 400 from an SM-DP server. The device receives the NOP 410, shared IMSI 412 and device root key 414 by subscription manager secure routing (SM-SR) using local connectivity such as a universal serial bus (USB) connection or a wireless local area network (WLAN) or other suitable method of local connectivity. The NOP 410 is installed at the device 400, for example in a factory or retail store, and the customer receives the device in state 404. In state 404, the NOP 410 enables the device 400 to access limited services from the cellular network such as services for downloading a fully operational profile.

To change the device from state 404 to state 406, the device performs an AKA procedure using the device root key 414 and downloads an operational profile (OP) 416 using the cellular network. In state 406, the device 400 is fully functional in the cellular network.

Figure 5:
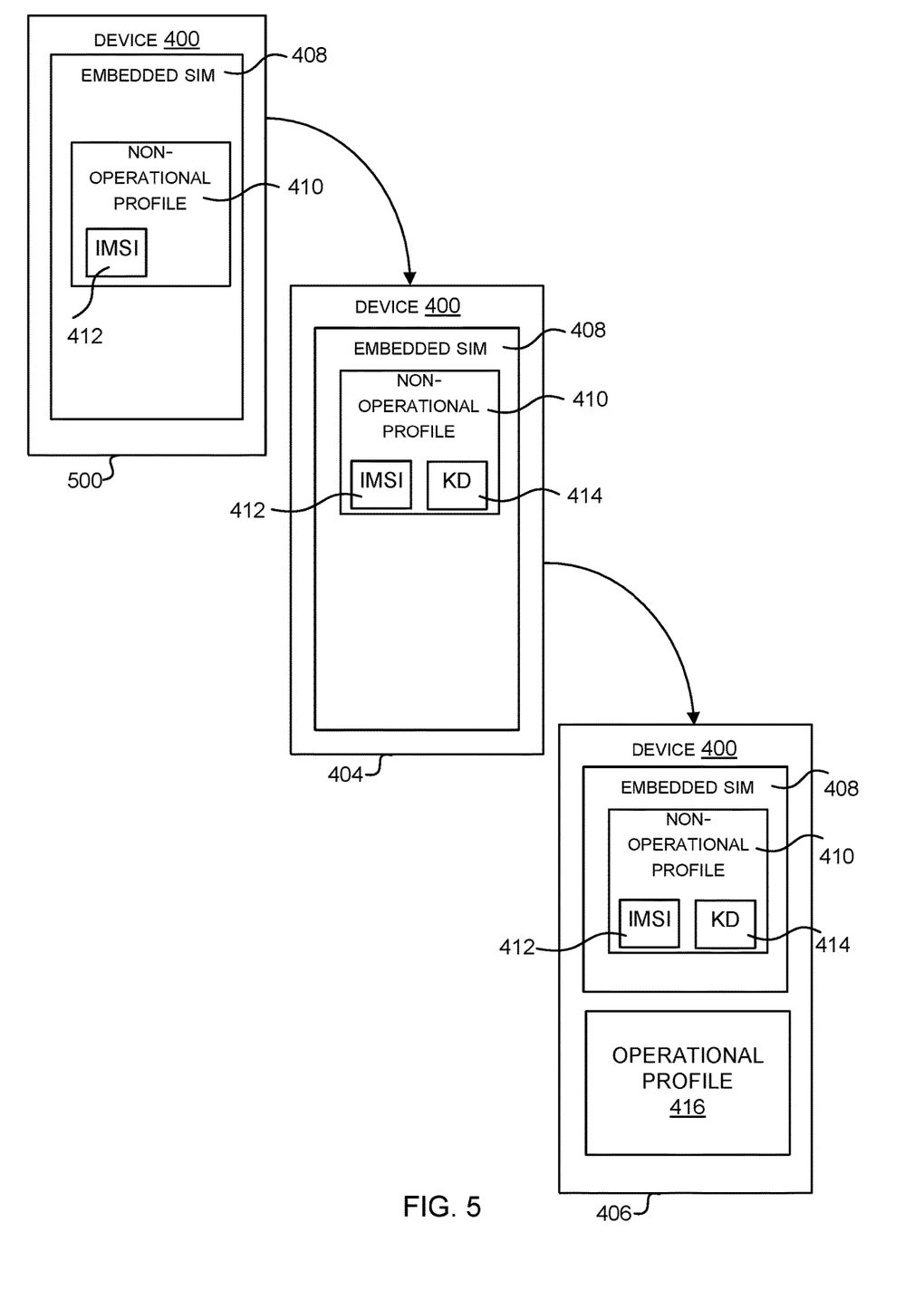
FIG. 5 another series of state diagrams of a mobile device at different stages of provisioning an embedded SIM of the device.

In other examples, the NOP 410 and shared IMSI 412 are received before the device root key 414 is received, as shown in FIG. 5. Before the device root key 414 is received, the device 400 is in a state 500 in which the NOP 410 and shared IMSI 412 have been received by the device 400. To change the device from state 500 to state 404, the NOP 410 is updated by retrieving the device root key 414 from the SM-DP server by SM-SR.

Figure 6:
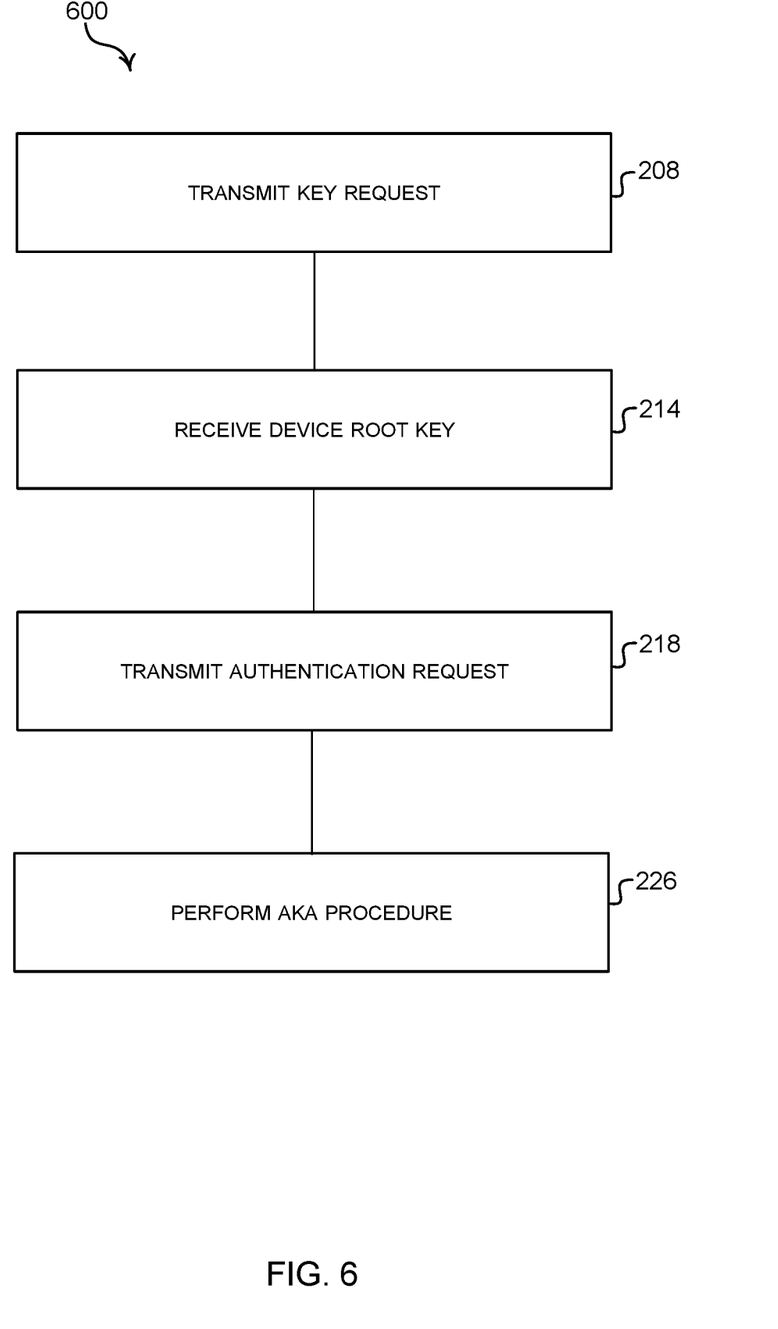
FIG. 6 is a flow chart of a method performed at a device for provisioning an embedded SIM at the device.

FIG. 6 shows a method 600 of SIM provisioning at a device such as the device 122 of FIG. 1. The method 600 is performed at the device and uses the signaling procedure 200 of FIG. 2. At block 208, the device transmits a key request to a provisioning server and, at block 214, receives a device root key associated with the device from the provisioning server. At block 218, the device transmits an authentication request comprising an IMSI and a device identifier identifying the device to a first HSS. At block 226, the device performs an AKA procedure using the device root key.

Figure 7:
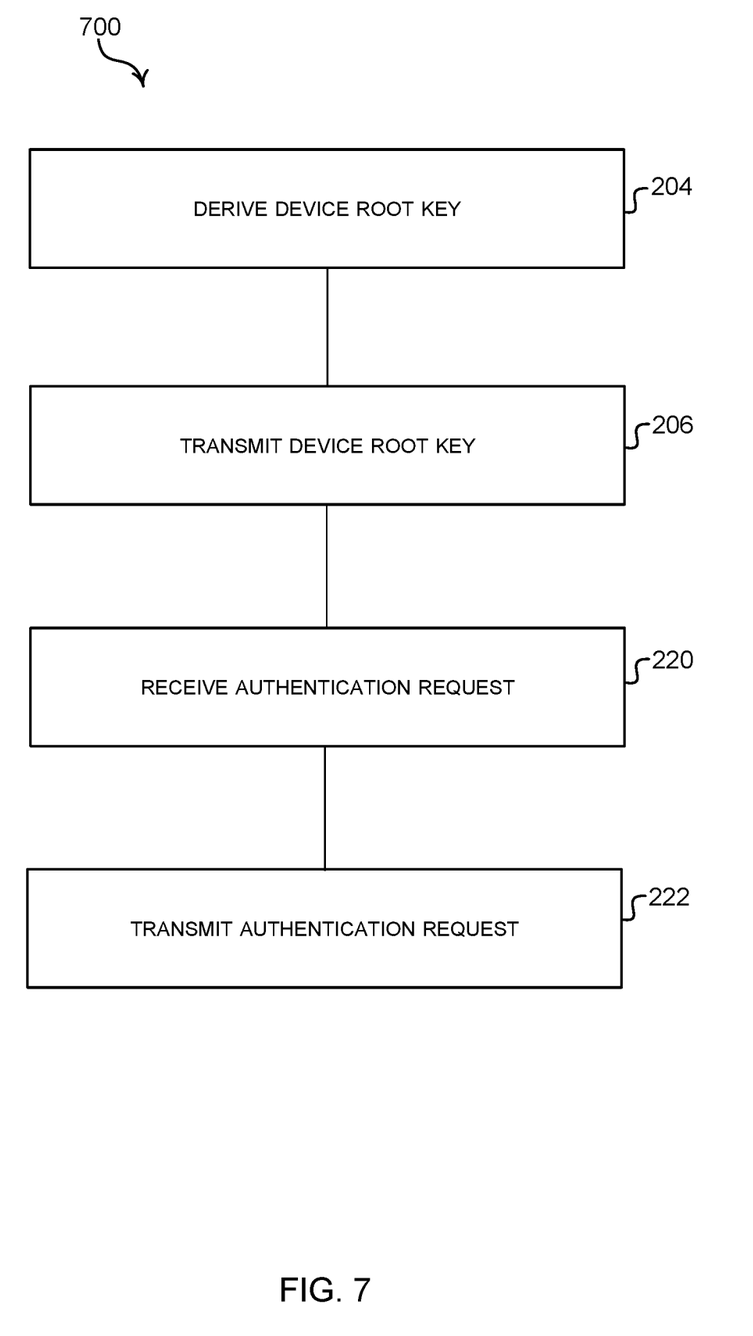
FIG. 7 is a flow chart of a method performed at a first HSS for provisioning an embedded SIM at the device.

FIG. 7 shows a method 700 of SIM provisioning at a first HSS such as the first HSS 102 of FIG. 1. The method 700 is performed at the first HSS and uses the signaling procedure 200 of FIG. 2. At block 204, the first HSS derives a device root key associated with a device and, at block 206, transmits the device root key to a second HSS. At block 220, the first HSS receives an authentication request comprising an IMSI and a device identifier associated with the device from the device. At block 222, the first HSS transmits the authentication request to the second HSS.

Figure 8:
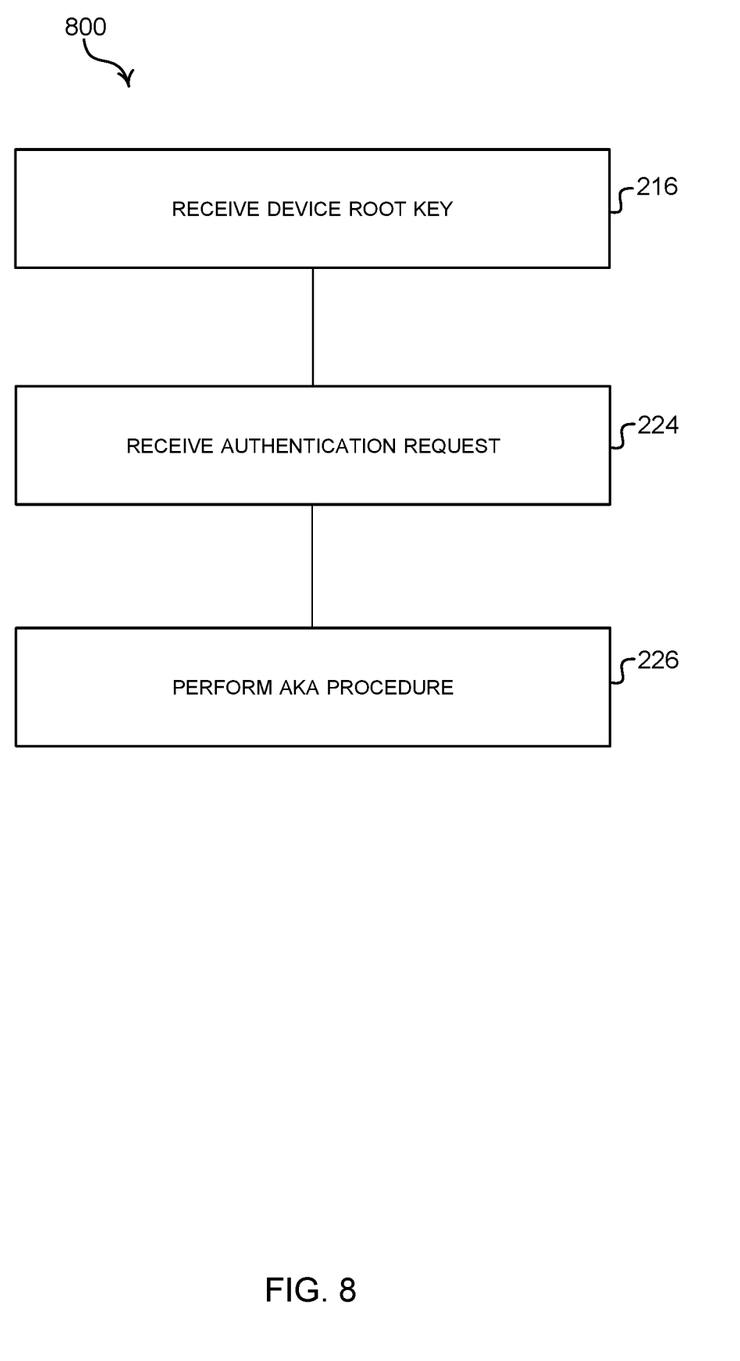
FIG. 8 is a flow chart of a method performed at a second HSS for provisioning an embedded SIM at the device.

FIG. 8 shows a method 800 of SIM provisioning at a second HSS such as the second HSS 104 of FIG. 1. The method 800 is performed at the second HSS and uses the signaling procedure 200 of FIG. 2. At block 216, the second HSS receives a device root key associated with a device from a first HSS. At block 224, the second HSS receives an authentication request comprising an IMSI and a device identifier associated with the device from the first HSS. At block 226, the second HSS performs an AKA procedure using the device root key.

Figure 9:
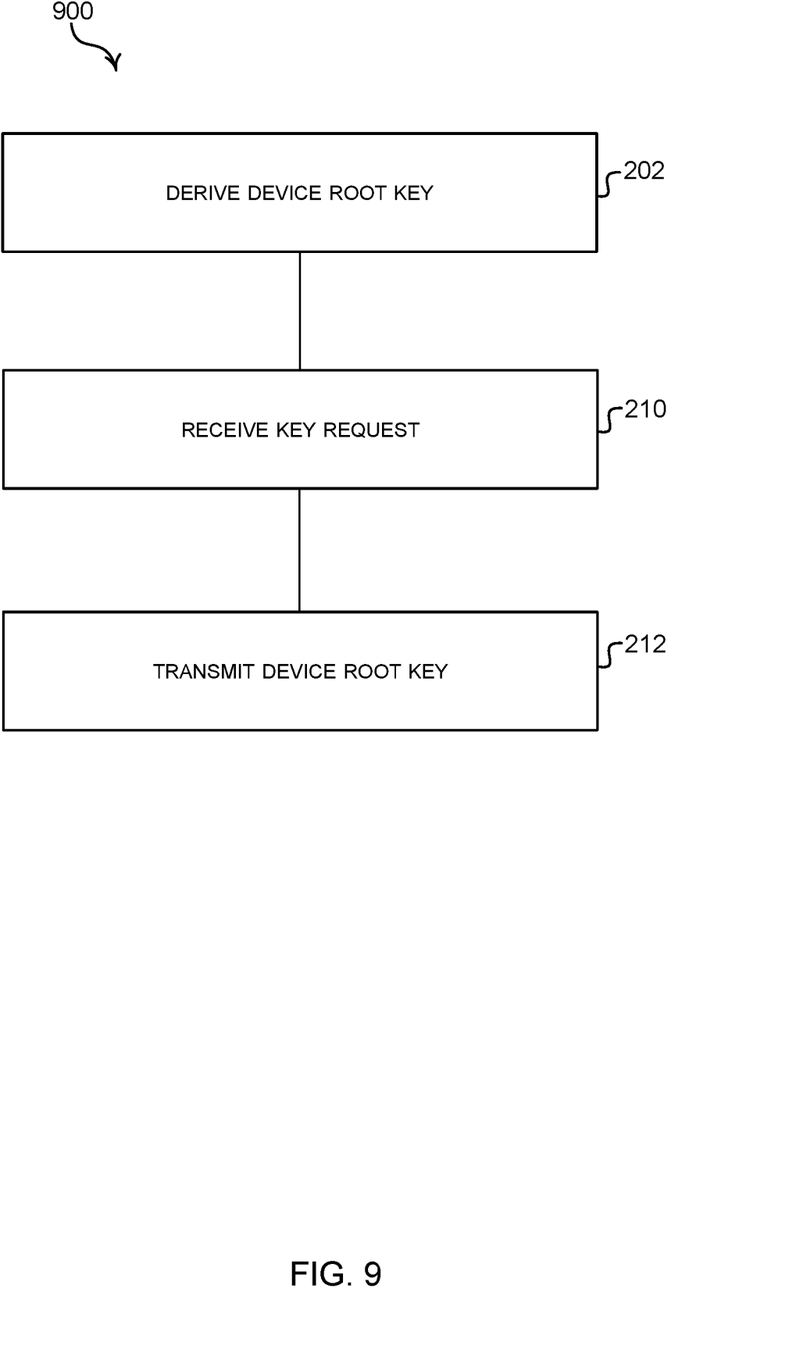
FIG. 9 is a flow chart of a method performed at a provisioning server for provisioning an embedded SIM at the device.

FIG. 9 shows a method 900 of SIM provisioning at a provisioning server such as the provisioning server 124 of FIG. 1. The method 900 is performed at the provisioning server and uses the signaling procedure 200 of FIG. 2. At block 202, the provisioning server derives a device root key associated with a device. At block 210, the provisioning server receives a key request from the device and, at block 212, transmits the device root key to the device.

Figure 10:
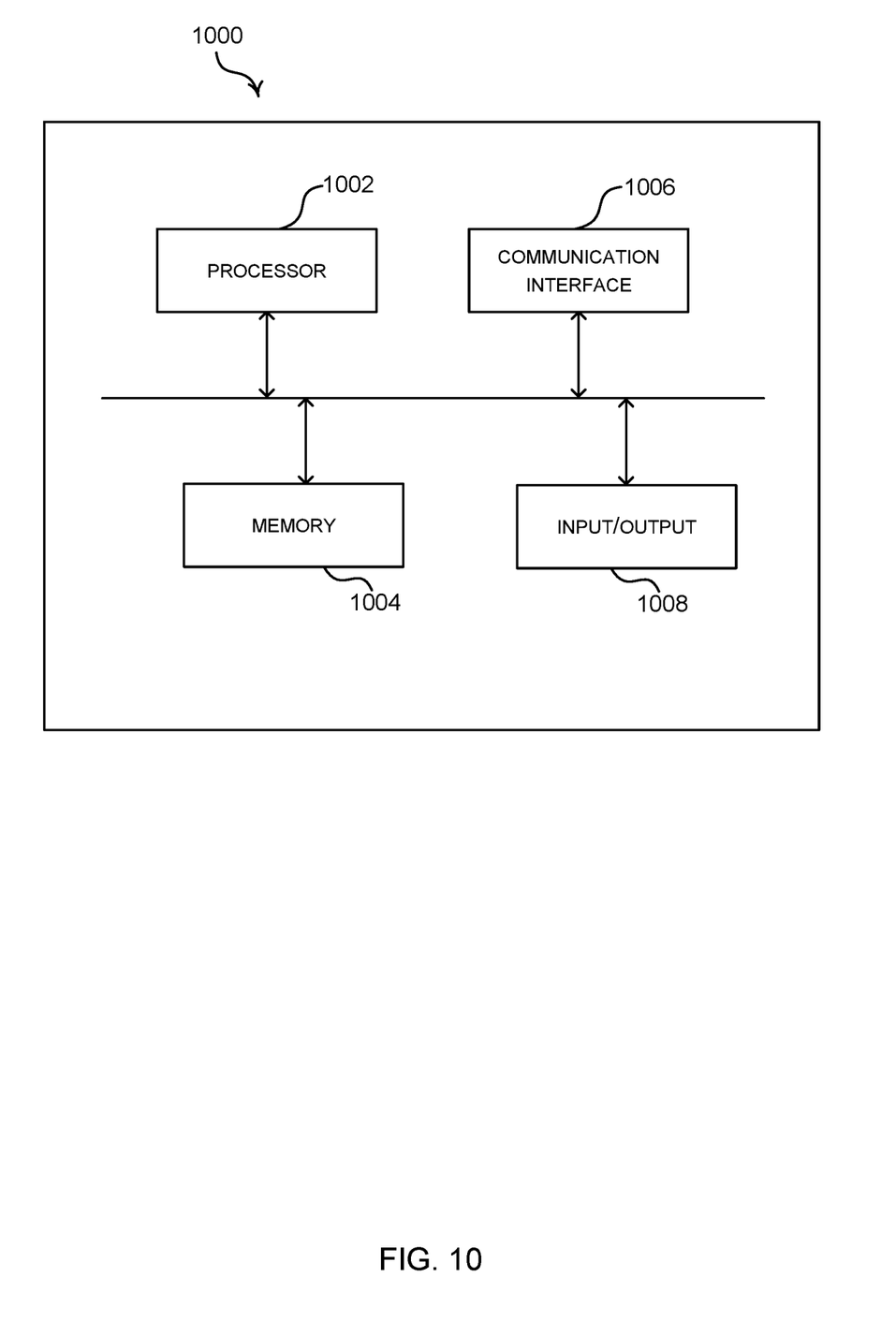
FIG. 10 is a schematic diagram illustrating an exemplary computing-based device in which embodiments of the device, first HSS, second HSS and provisioning server may be implemented.

FIG. 10 illustrates various components of an exemplary computing-based device 1000 which may be implemented as any form of a computing and/or electronic device, and in which at least components of embodiments of the first HSS 102, the second HSS 104, the device 122 and the provisioning server 124 may be implemented.

Computing-based device 1000 comprises one or more processors 1002 which may be microprocessors, controllers or any other suitable type of processors for processing computer executable instructions to control the operation of the device in order to perform SIM provisioning as defined in the claims. Platform software comprising an operating system or any other suitable platform software may be provided at the computing-based device to enable application software to be executed on the device.

The computer executable instructions may be provided using any computer-readable media that is accessible by computing based device 1000. Computer-readable media may include, for example, computer storage media such as memory 1004 and communications media. Computer storage media, such as memory 1004, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1004) is shown within the computing-based device 1000 it will be appreciated that the storage may be distributed or located remotely and accessed via a network or other communication link (e.g. using communication interface 1006).

The computing-based device 1000 also comprises an input/output controller 1008 arranged to output display information to a display device which may be separate from or integral to the computing-based device 1000. The display information may provide a graphical user interface. The input/output controller 1008 is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). In an embodiment the display device may also act as the user input device if it is a touch sensitive display device. The input/output controller xxx may also output data to devices other than the display device, e.g. a locally connected printing device.

Any of the input/output controller 1008, display device and the user input device may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

In various of the present examples, there is provided a first HSS comprising: a key derive module configured to derive a device root key associated with a device; a key transmit module configured to transmit the device root key to a second HSS; an authentication request receive module configured to receive an authentication request comprising an IMSI and a device identifier associated with the device from the device; and an authentication request transmit module configured to transmit the authentication request to a second HSS, whereby the key derive module, the key transmit module, the authentication request receive module and the authentication request transmit module authenticate the device for SIM provisioning of the device. The first HSS may be configured: to derive the device root key from the device identifier and a subscriber root key associated with the IMSI; to receive the device identifier from a provisioning server; to receive the device identifier as part of a batch of device identifiers; and to recognize that the authentication request includes the device identifier, and transmit the authentication request to the second HSS in response to recognizing that the authentication request includes the device identifier. The device identifier may comprise an IMEI.

In various of the present examples, there is provided a second HSS comprising: a key receive module configured to receive a device root key associated with a device from a first HSS; an authentication request receive module configured to receive an authentication request comprising an IMSI and a device identifier associated with the device from the first HSS; and an AKA module configured to perform an AKA procedure using the device root key, whereby the key receive module, the authentication request receive module and the AKA module authenticate the device for SIM provisioning of the device. The second HSS may be configured: to store the device root key in a store of device root keys; to index each device root key in the store by its corresponding device identifier; and to perform the AKA procedure by communicating with the device. The device root key may be derived using the device identifier and a subscriber root key associated with the IMSI. The device identifier may comprise an IMEI. In various of the present examples, there is provided a provisioning server comprising: a key derive module configured to derive a device root key associated with a device; a key request receive module configured to receive a key request from the device; and a key transmit module configured to transmit the device root key to the device, whereby the key derive module, the key request receive module and the key transmit module authenticate the device for SIM provisioning of the device. The provisioning server may comprise a SM-DP; may be configured to derive the device root key by using a key derivation function; may be configured to transmit the device identifier to an HSS as part of a batch of device identifiers; and may be configured to receive a NOP request from the device and transmit a device NOP to the device. The key derivation function may use the IMSI and the device identifier as input parameters.

In various of the present examples, there is provided a method of SIM provisioning at a first HSS comprising: deriving a device root key associated with a device; transmitting the device root key to a second HSS; receiving an authentication request comprising an IMSI and a device identifier associated with the device from the device; and transmitting the authentication request to a second HSS. The method may comprise deriving the device root key from the device identifier and a subscriber root key associated with the IMSI; may comprise receiving the device identifier from a provisioning server; may comprise receiving the device identifier as part of a batch of device identifiers; and may comprise recognizing that the authentication request includes the device identifier, and wherein the authentication request is transmitted to the second HSS in response to recognizing that the authentication request includes the device identifier. The device identifier may comprise an IMEI.

In various of the present examples, there is provided a method of SIM provisioning at a second HSS comprising: receiving a device root key associated with a device from a first HSS; receiving an authentication request comprising an IMSI and a device identifier associated with the device from the first HSS; and performing an AKA procedure using the device root key. The method may comprise storing the device root key in a store of device root keys; and may comprise indexing each device root key in the store by its corresponding device identifier. The AKA procedure may be performed by communicating with the device. The device root key may be derived using the device identifier and a subscriber root key associated with the IMSI. The device identifier may comprise an IMEI.

In various of the present examples, there is provided a method of SIM provisioning at a provisioning server comprising: deriving a device root key associated with a device; receiving a key request from the device; and transmitting the device root key to the device. The provisioning server may comprise a SM-DP. Deriving the device root key may comprise using a key derivation function. The method may comprise transmitting the device identifier to an HSS as part of a batch of device identifiers; and may comprise receiving a NOP request from the device and transmitting a device NOP to the device. The key derivation function may use the IMSI and the device identifier as input parameters.

In other examples there is provided one or more tangible device-readable media with device-executable instructions that, when executed by a computing system, direct the computing system to perform any of the above methods.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to authenticate the device for the desired functions. It is also intended to encompass software which "describes" or defines the configuration of hardware, such as HDL (hardware description language) software, as is used for designing silicon chips, or for configuring universal programmable chips, to authenticate the device for desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of subscriber identity module (SIM) provisioning at a mobile device, the method comprising:
obtaining a first device profile, wherein the first device profile corresponds to a shared international mobile subscriber identity (IMSI) and enables a limited cellular communication for the mobile device;
sending, via the limited cellular communication, a device identifier for the mobile device to a server; and
in response to the sending, obtaining, via the limited cellular communication, a second device profile, wherein the second device profile enables additional cellular communication for the mobile device as compared to the first device profile.

2. The method of claim 1, wherein the IMSI is used for provisioning a plurality of mobile devices having embedded SIMs.

3. The method of claim 1, wherein the second device profile corresponds to the shared IMSI and the device identifier.

4. The method of claim 1, wherein the limited cellular communication allows access to limited services from a cellular network to download the second device profile, wherein the first device profile comprises a non-operational profile (NOP) and the second device profile comprises an operational profile (OP).

5. The method of claim 4, wherein the first device profile is received from a local connection, the local connection comprising a non-cellular connection.

6. The method of claim 5, further comprising updating the NOP by obtaining a device root key uniquely associated with the mobile device, the device root key derived using the device identifier and a subscriber root key associated with the shared IMSI, the device root key enabling the second device profile to be obtained.

7. The method of claim 6, wherein the device root key is indexed by the IMSI that is associated with the device identifier, and the device identifier comprises an international mobile equipment identity (IMEI).

8. A mobile device comprising:
an embedded subscriber identity module (SIM); and
a processor configured to:
obtain a first device profile, wherein the first device profile corresponds to a shared international mobile subscriber identity (IMSI) and enables a limited cellular communication for the mobile device;
send, via the limited cellular communication, a device identifier for the mobile device to a server; and
in response to the send, obtain, via the limited cellular communication, a second device profile, wherein the second device profile enables additional cellular communication for the mobile device as compared to the first device profile.

9. The mobile device of claim 8, wherein the IMSI is used for provisioning a plurality of mobile devices having embedded SIMs.

10. The mobile device of claim 8, wherein the second device profile corresponds to the shared IMSI and the device identifier.

11. The mobile device of claim 8, wherein the limited cellular communication allows access to limited services from a cellular network to download the second device profile, wherein the first device profile comprises a non-operational profile (NOP) and the second device profile comprises an operational profile (OP).

12. The mobile device of claim 11, wherein the first device profile is received from a local connection, the local connection comprising a non-cellular connection.

13. The mobile device of claim 12, wherein the processor is further configured to update the NOP by obtaining a device root key uniquely associated with the mobile device, the device root key derived using the device identifier and a subscriber root key associated with the shared IMSI, the device root key enabling the second device profile to be obtained.

14. The mobile device of claim 13, wherein the device root key is indexed by the IMSI that is associated with the device identifier, and the device identifier comprises an international mobile equipment identity (IMEI).

15. One or more computer storage media having computer-executable instructions that, upon execution by a processor of a mobile device, cause the processor to at least:
obtain, a first device profile, wherein the first device profile corresponds to a shared international mobile subscriber identity (IMSI) and enables a limited cellular communication for the mobile device;
send, via the limited cellular communication, a device identifier for the mobile device to a server; and
in response to the send, obtain, via the limited cellular communication, a second device profile, wherein the second device profile enables additional cellular communication for the mobile device as compared to the first device profile.

16. The one or more computer storage media of claim 15, wherein the IMSI is used for provisioning a plurality of mobile devices having embedded SIMs.

17. The one or more computer storage media of claim 15, wherein the second device profile corresponds to the shared IMSI and the device identifier.

18. The one or more computer storage media of claim 15, wherein the limited cellular communication allows access to limited services from a cellular network to download the second device profile, wherein the first device profile comprises a non-operational profile (NOP) and the second device profile comprises an operational profile (OP).

19. The one or more computer storage media of claim 18, wherein the first device profile is received from a local connection, the local connection comprising a non-cellular connection.

20. The one or more computer storage media of claim 18, wherein the computer-executable instructions, upon execution, further cause the processor to at least update the NOP by obtaining a device root key uniquely associated with the mobile device, the device root key derived using the device identifier and a subscriber root key associated with the shared IMSI, the device root key enabling the second device profile to be obtained, the device root key being indexed by the IMSI that is associated with the device identifier, and the device identifier comprising an international mobile equipment identity (IMEI).

\* \* \* \* \*